US012399940B2

(12) United States Patent
Ahrens et al.

(10) Patent No.: US 12,399,940 B2
(45) Date of Patent: Aug. 26, 2025

(54) SYSTEM AND METHOD FOR GENERATING RELEVANT SETS OF RESULTS USING DATASETS

(71) Applicant: Verizon Media Inc., New York, NY (US)

(72) Inventors: Matthew Robert Ahrens, Champaign, IL (US); Jifu Zhao, Seattle, WA (US); Kevin Andrew Perkins, Champaign, IL (US); Ashwini Kumar Kounduri, Urbana, IL (US); Mithilesh Nanjamanaidu Srinivasan Rangavadivel, Champaign, IL (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 17/483,256

(22) Filed: Sep. 23, 2021

(65) Prior Publication Data

US 2023/0088722 A1  Mar. 23, 2023

(51) Int. Cl.
*G06F 16/903* (2019.01)
*G06F 16/9038* (2019.01)

(52) U.S. Cl.
CPC .... *G06F 16/9038* (2019.01); *G06F 16/90335* (2019.01)

(58) Field of Classification Search
CPC .......... G06F 16/9038; G06F 16/90335; G06F 16/2465; G06F 16/248
See application file for complete search history.

(56) References Cited

U.S. PATENT DOCUMENTS

| | | | |
|---|---|---|---|
| 10,237,294 B1* | 3/2019 | Zadeh | H04L 61/45 |
| 10,621,180 B2* | 4/2020 | Patthak | G06F 16/3344 |
| 11,061,942 B2* | 7/2021 | Watts | G06F 16/9038 |
| 11,093,561 B2* | 8/2021 | Douze | G06Q 50/01 |
| 11,644,955 B1* | 5/2023 | Singamneni | G06F 3/0481 707/722 |
| 2013/0159507 A1* | 6/2013 | Mason | G06Q 50/01 709/224 |
| 2018/0285685 A1* | 10/2018 | Singh | G06F 16/9038 |
| 2019/0012392 A1* | 1/2019 | Chen | G06F 16/00 |
| 2019/0042618 A1* | 2/2019 | Potulska | G06N 5/01 |
| 2019/0102553 A1* | 4/2019 | Herwadkar | G06N 20/00 |
| 2019/0171777 A1* | 6/2019 | Sobhy Deraz | G06F 9/54 |
| 2020/0211716 A1* | 7/2020 | Lefkofsky | G06F 18/214 |
| 2020/0341985 A1* | 10/2020 | Johnson | H04L 63/1425 |
| 2021/0081418 A1* | 3/2021 | Silveira | G06F 16/248 |
| 2021/0174958 A1* | 6/2021 | Drake | G16H 20/10 |
| 2021/0232632 A1* | 7/2021 | Howard | G06F 16/9038 |
| 2022/0129828 A1* | 4/2022 | Yates | G06N 5/04 |

* cited by examiner

*Primary Examiner* — Kris E Mackes
(74) *Attorney, Agent, or Firm* — Cooper Legal Group LLC

(57) ABSTRACT

One or more computing devices, systems, and/or methods are provided. In an example, a dataset associated with a plurality of dimensions and a plurality of metrics is identified. A subset of dimensions of the plurality of dimensions and a subset of metrics of the plurality of metrics are selected based upon historical dataset queries. A plurality of sets of results is generated, using the dataset, based upon the subset of dimensions and the subset of metrics. A plurality of significance scores is determined based upon the plurality of sets of results. One or more first sets of results of the plurality of sets of results are selected based upon the plurality of significance scores.

20 Claims, 8 Drawing Sheets

SYSTEM AND METHOD FOR GENERATING RELEVANT SETS OF RESULTS USING DATASETS

BACKGROUND

A service may provide a platform for generating and/or viewing data reports. For example, a user may interact with the platform by at least producing and running code corresponding to a programming language of the platform, entering parameters of a desired data report, etc. Correctly entering the code and/or parameters to obtain the desired data report may be difficult and/or time-consuming for the user.

SUMMARY

In accordance with the present disclosure, one or more computing devices and/or methods are provided. In an example, a dataset associated with a plurality of dimensions and a plurality of metrics is identified. A subset of dimensions of the plurality of dimensions and a subset of metrics of the plurality of metrics are selected based upon historical dataset queries. A plurality of sets of results is generated, using the dataset, based upon the subset of dimensions and the subset of metrics. Generating the plurality of sets of results comprises generating a first set of results based upon a first dimension of the subset of dimensions and a first metric of the subset of metrics. Generating the plurality of sets of results comprises generating a second set of results based upon a second dimension of the subset of dimensions and a second metric of the subset of metrics. A plurality of significance scores is determined based upon the plurality of sets of results. The plurality of significance scores comprises a first significance score associated with the first set of results and a second significance score associated with the second set of results. One or more first sets of results of the plurality of sets of results are selected based upon the plurality of significance scores.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
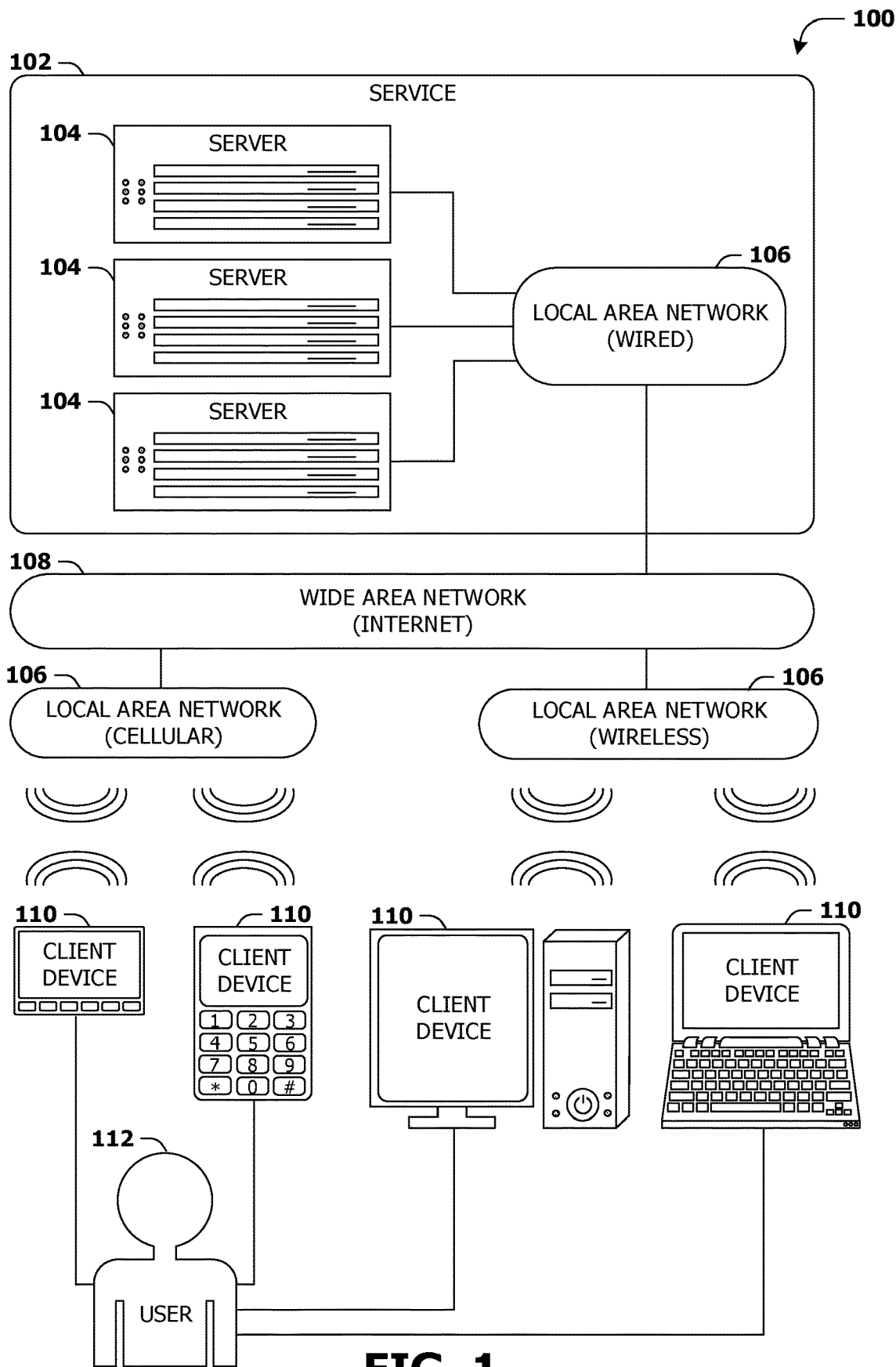
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
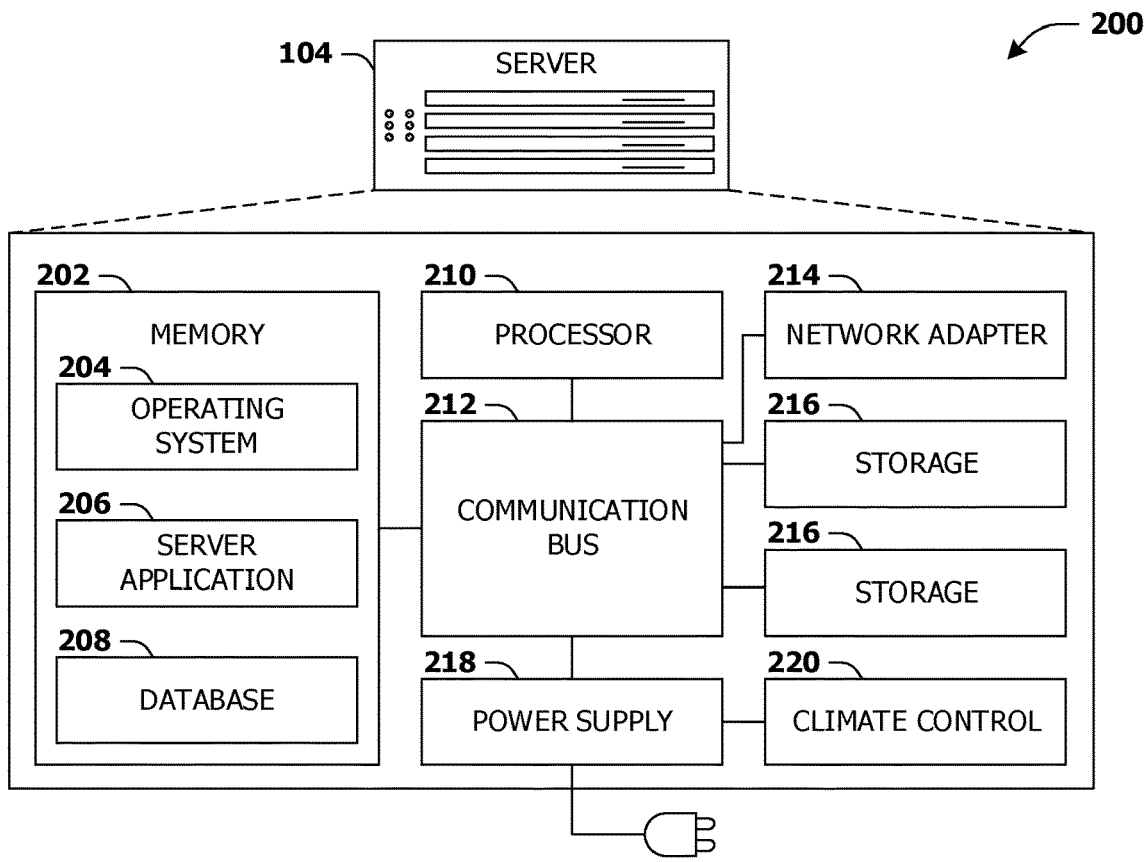
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
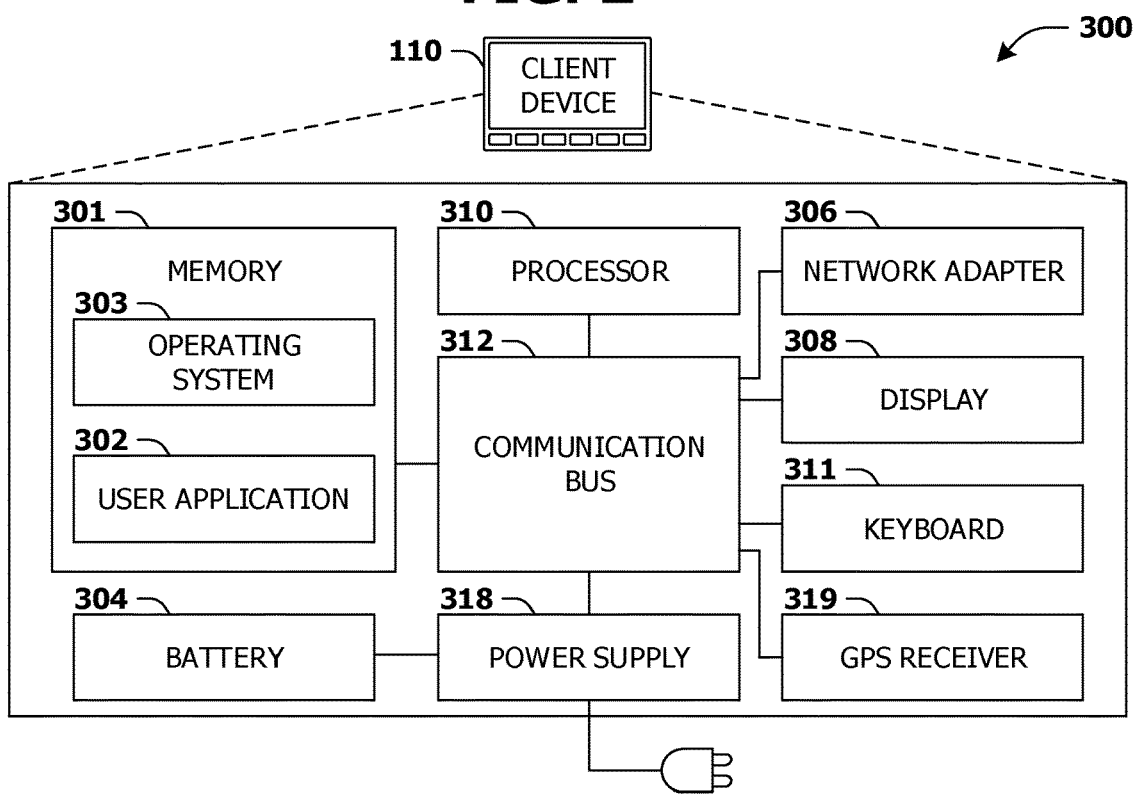
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating relevant sets of results and/or providing representations of the relevant sets of results are provided. A user (and/or a device) may access and/or interact with a service (e.g., a business intelligence service), such as a website, an application, software, etc. that provides a platform for generating and/or viewing data reports. For example, a user may interact with the platform by at least producing and running code corresponding to a programming language of the platform, entering parameters of a desired set of results, etc. Correctly entering the code and/or parameters to obtain the desired set of results may be difficult and/or time-consuming for the user. Further, in order to obtain relevant sets of results, the user may need to enter numerous queries (e.g., a query may be entered by at least one of producing and entering code, selecting various parameters, etc.), generate sets of results based upon the numerous queries, and browse through the sets of results individually until the user finds one or more sets of results that are relevant (such as a set of results associated with a significant change across measures), which may be difficult and/or costly.

Thus, in accordance with one or more of the techniques presented herein, one or more relevant sets of results may be (e.g., automatically) generated, identified and/or provided to the user. In an example, a subset of entities (e.g., relevant entities) may be selected from among a plurality of entities associated with a dataset. The plurality of entities may comprise dimensions, metrics and/or dimension elements. The subset of entities may be selected from among the plurality of entities to narrow a search scope of entities for use in generating and/or detecting relevant sets of results. In an example, the subset of entities may be selected based upon relevance scores associated with the plurality of entities. A relevance score may correspond to a measure of relevance (e.g., usefulness and/or importance) of an entity to the user, which may be determined based upon historical user query patterns, such as historical dataset queries associated with the user and/or the dataset. Accordingly, the subset of entities may correspond to entities that, among the plurality of entities, are utilized by the user (and/or other users of the dataset).

The subset of entities may be used to generate a plurality of sets of results. For example, the plurality of sets of results may be generated (e.g., iteratively generated) based upon different combinations of entities from the subset of entities. Significance scores associated with the plurality of sets of results may be determined, and the significance scores may be used to select one or more relevant sets of results from among the plurality of sets of results. In an example, a significance score may be reflective of (and/or based upon) a change (e.g., an increase and/or decrease) across measures associated with a set of results (e.g., the measures may comprise one or more measures indicated by the set of results and/or one or more measures indicated by one or more comparable set of results), where a higher value of the change may correspond to (e.g., result in) a higher value of the significance score. In an example, in response to selecting the one or more relevant sets of results, one or more representations of the one or more relevant sets of results may be generated and/or may be provided to the user. The one or more representations may be ranked and/or ordered based upon significance scores associated with the one or more relevant sets of results. Thus, the user may be provided with the one or more relevant sets of results more quickly and/or with less (or no) manual effort. Alternatively and/or additionally, using one or more of the techniques herein, relevant sets of results may be generated and/or identified more accurately than manually inputting queries to generate different sets of results, manually browsing through the different sets of results to identify relevant sets of results, etc.

Figure 4:
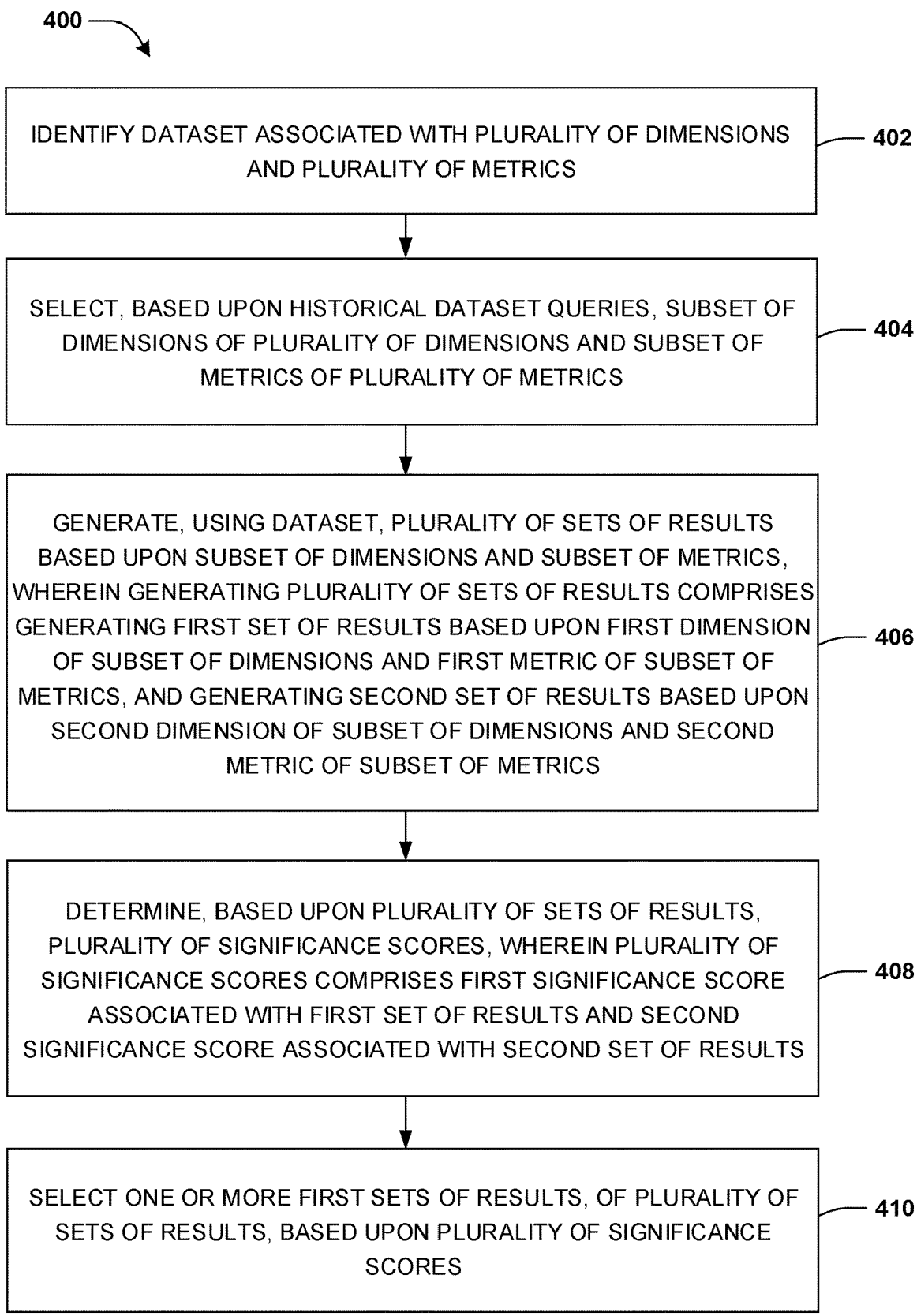
FIG. 4 is a flow chart illustrating an example method for generating relevant sets of results using datasets.

An embodiment of generating relevant sets of results and/or providing representations of the relevant sets of results is illustrated by an example method 400 of FIG. 4, and is further described in conjunction with system 501 of FIGS. 5A-5D.

At 402, a first dataset associated with a plurality of dimensions and/or a plurality of metrics may be identified. In some examples, the first dataset comprises structured data indicative of relations among entities and/or variables. In some examples, the first dataset may comprise a plurality of fields and/or values of the plurality of fields. The first dataset may be stored on a database. In some examples, a dimension of the plurality of dimensions (and/or each dimension of the plurality of dimensions) may correspond to at least one of to a category, an attribute, etc. of data in the first dataset. A metric of the plurality of metrics (and/or each metric of the plurality of metrics) may correspond to a type of value, such as at least one of a measure (e.g., a quantitative measurement), an average, a quantity, a total, etc.

In some examples, the first dataset is associated with a plurality of sets of dimension elements. A set of dimension elements of the plurality of sets of dimension elements (and/or each set of dimension elements of the plurality of sets of dimension elements) may comprise one or more elements of a dimension of the plurality of dimensions. In an example in which a dimension of the plurality of dimensions is "phone manufacturer", a set of dimension elements associated with the dimension may comprise various phone manufacturers.

Figure 5A:
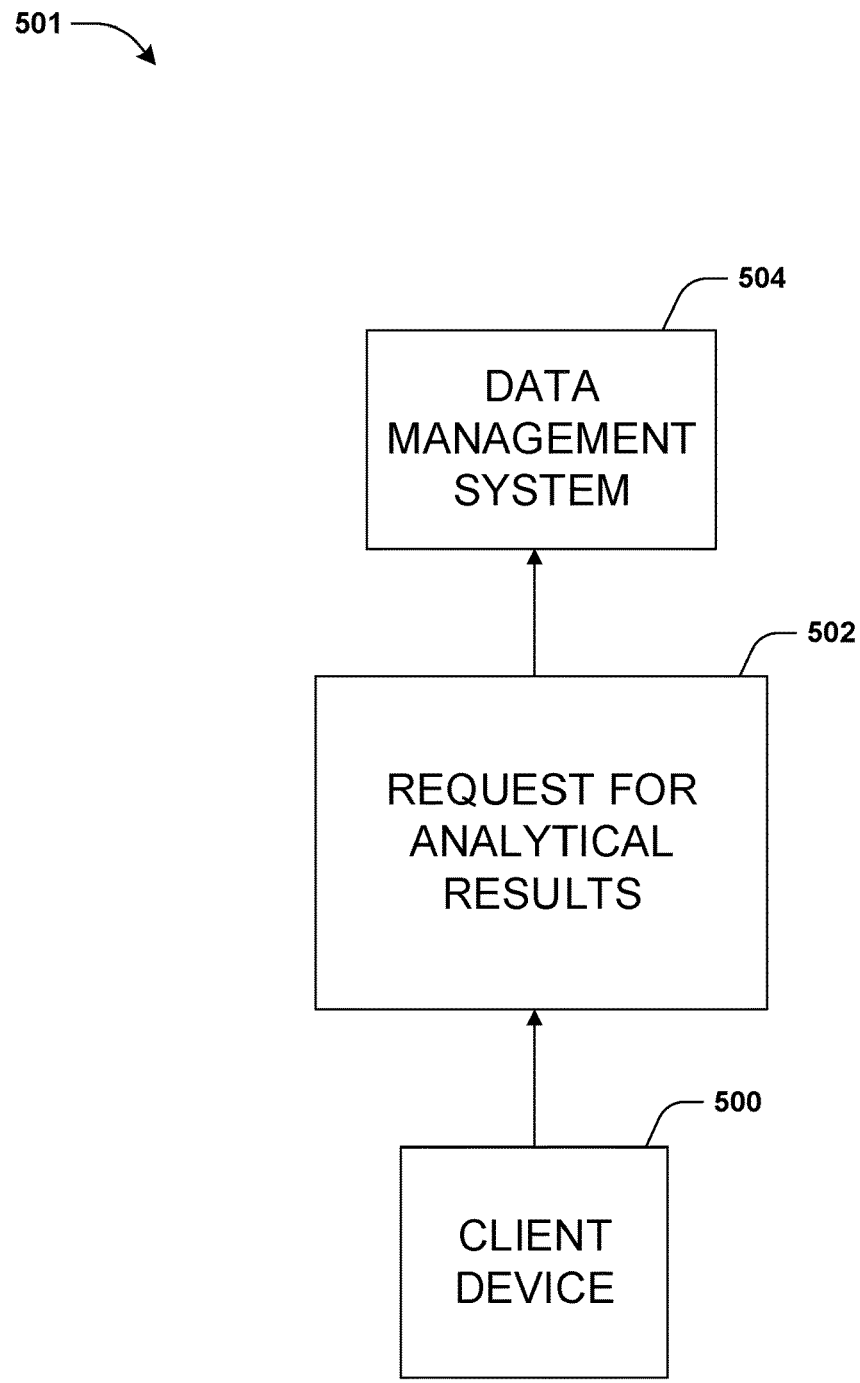
FIG. 5A is a component block diagram illustrating an example system for generating relevant sets of results using datasets, where a request for analytical results is received from a first client device.

In some examples, the first dataset may be identified based upon a first request. FIG. 5A illustrates the first request (shown with reference number 502) being received, by a data management system 504, from a first client device 500. The first client device 500 may comprise at least one of a phone, a laptop, a computer, a wearable device, a smart device, a television, any other type of computing device, hardware and/or software. The first request 502 may be a request for analytical results, such as a request for one or more relevant sets of results. In some examples, the first dataset may be identified (for use in generating one or more relevant sets of results for presentation via the first client device 500, for example) based upon the first request 502 (e.g., the first request 502 may comprise an indication of the first dataset). Alternatively and/or additionally, the first dataset may be identified (and/or generated) based upon user information associated with the first client device 500, wherein the user information may be determined based upon the first request 502 (and/or based upon other information received from the first client device 500). In an example, data that a first user of the first client device 500 is authorized to access may be determined based upon the user information. The first dataset may be identified (for use in generating one or more relevant sets of results for presentation via the first client device 500, for example) based upon a determination that the first user is authorized to access data of the first dataset. Alternatively and/or additionally, in response to determining that the first user is authorized to view one or more sets of data, the first dataset may be generated based upon the one or more sets of data (e.g., the one or more sets of data may be included in the first dataset).

In an example, the first dataset may comprise a content item event dataset (e.g., an advertisement event dataset, a marketing event dataset, etc.). For example, the content item event dataset may comprise information associated with content item events (e.g., advertisement events, marketing events, etc.). For example, the content item event dataset may comprise information associated with presentation of one or more first content items (e.g., one or more advertisements) over a period of time. For example, the one or more first content items may be presented via client devices (e.g., at least one of phones, laptops, computers, wearable devices, smart devices, televisions, any other type of computing device, hardware and/or software) as part of one or more content item campaigns (e.g., one or more advertisement campaigns) to promote at least one of one or more companies, one or more brands, one or more organizations, etc. Accordingly, information of the first dataset may be used (e.g., analyzed) to track performance of the one or more content item campaigns. The content item events may comprise at least one of content item presentations, content item selections, etc. A content item presentation may correspond to presentation of a content item (e.g., an advertisement) of the one or more first content items via a client device (e.g., the content item presentation may be an advertisement impression). A content item selection may correspond to a selection of a content item (e.g., an advertisement) of the one or more first content items via a client device (e.g., the content item selection may be an advertisement click). In some examples, the content item event dataset may comprise at least one of indications of the content item events (e.g., an indication of a content item presentation, an indication of a content item selection, etc.), times of the content item events, locations of the content item events (e.g., cities, states, and/or countries of the content item events), ages of users of the content item events, genders of users of the content item events, amounts of revenue received as a result of the content item events, conversion events attributed to the content item events (e.g., a conversion event may correspond to a purchase of a product and/or service associated with a content item, such as a product and/or service advertised by the content item), content items presented in the content item events, web pages associated with the content item events (e.g., web pages within which content items are presented and/or selected), publishers associated with the content item events (e.g., publishers of the web pages), etc. In an example in which the first dataset is a content item event dataset, the plurality of dimensions may comprise at least one of a time of day dimension (associated with times of content item events, for example), a day of week dimension (associated with times of content item events, for example), a month dimension, a location dimension (associated with locations of content item events, for example), a country dimension (associated with locations of content item events, for example), a city dimension, a state dimension, an age dimension (associated with users of content item events, for example), a gender dimension (associated with users of content item events, for example), etc. In some examples, a set of dimension elements of the plurality of sets of dimension elements (and/or each set of dimension elements of the plurality of sets of dimension elements) is associated with a dimension of the plurality of dimensions. In the example in which the first dataset is the content item event dataset, the plurality of sets of dimension elements may comprise at least one of a set of age ranges (e.g., at least one of 10-20, 20-30, 30-40, etc.) associated with the age dimension, a set of time of day intervals (e.g., at least one of 7:00 AM-8:00 AM, 8:00 AM-9:00 AM, etc.) associated with the time of day dimension, a set of states (e.g., Ohio, California, Wyoming, etc.) associated with the state dimension, etc. Alternatively and/or additionally, the plurality of metrics may comprise at least one of a measure of content item presentations (e.g., a measure of advertisement impressions), a measure of content item selections (e.g., a measure of advertisement clicks), a measure of revenue received as a result of content item events, etc.

In some examples, the term "measure" as used herein may correspond to a quantity, a rate, an amount, an average, a combination of one or more measures, and/or other metric. For example, a measure of content item presentations may correspond to a quantity of content item presentations, such as a total quantity of content item presentations during a period of time. Alternatively and/or additionally, the measure of content item presentations may correspond to a rate of content item presentations per unit of time. In an example in which the unit of time is a day, the rate of content item presentations may correspond to an average quantity of content item presentations per day during the period of time.

Alternatively and/or additionally, in an example, the first dataset may comprise a workforce dataset. For example, the workforce dataset may comprise information associated with performance of employees and/or offices of at least one of a company, an organization, a non-profit, a restaurant, a store, etc. and/or sales of at least one of the company, the organization, the non-profit, the restaurant, the store, etc. In some examples, the workforce dataset may comprise at least one of indications of sales, indications of employees and/or workplaces to which the sales are attributed, amounts of revenue as a result of the sales, employee names of employees, employee identification numbers of employees, residential locations of the employees, workplaces (e.g., a workplace identifier of at least one of an office, a store, a restaurant, a headquarters, a warehouse, a production factory, etc.), ages of employees, genders of employees, etc. In an example in which the first dataset is a workforce dataset, the plurality of dimensions may comprise at least one of an employee age dimension, an employee gender dimension, a working hours dimension (associated with working hours of employees), an employee education level dimension, a residential location dimension, a workplace dimension, a workplace location dimension, a type of sale dimension, etc. In the example in which the first dataset is the workforce dataset, the plurality of sets of dimension elements may comprise at least one of a set of age ranges associated with the employee age dimension, a set of types of sales (e.g., types of sales may be distinguished based upon at least one of different types of services and/or products sold, different clients to which products and/or services are sold, different client locations of clients to which products and/or services are sold, etc.) associated with the type of sale dimension, a set of working hours (e.g., working hours between 8:00 AM and 4:00 PM that some employees and/or workplaces adhere to, working hours between 10:00 AM and 6:00 PM that other employees and/or workplaces adhere to, etc.) associated with the working hours dimension, a set of education levels (e.g., high school graduate, Bachelors degree, Masters degree, etc.) associated with the employee education level dimension, a set of workplaces (e.g., workplace identifiers of at least one of offices, stores, restaurants, headquarters, warehouses, production factories, etc.), etc. Alternatively and/or additionally, the plurality of metrics associated with the workforce dataset may comprise at least one of a measure of sales by an employee, a measure of sales attributed to a workplace, a measure of revenue as a result of sales by an employee, a measure of revenue as a result of sales attributed to a workplace, a measure of store visits to a store, a measure of purchases (e.g., in-store purchases) at a store, etc.

It may be appreciated that the content item event dataset and the workforce dataset are examples of the first dataset, and that, in some examples, the first dataset may be any type of dataset. Other examples of the first dataset include a device dataset comprising information associated with operation and/or performance of one or more devices (e.g., one or more computers, one or more machines, equipment, etc.), a customer relationship management dataset comprising information associated with customer interactions of customers with a company, a store dataset comprising information (e.g., store hours, store visits by customers, store purchases, etc.) associated with one or more stores (e.g., stores of a chain), an internet resource dataset comprising information (e.g., web page visits, content accessed, web traffic, etc.) associated with one or more internet resources (e.g., at least one of one or more web pages, one or more applications, etc.), etc.

Figure 5B:
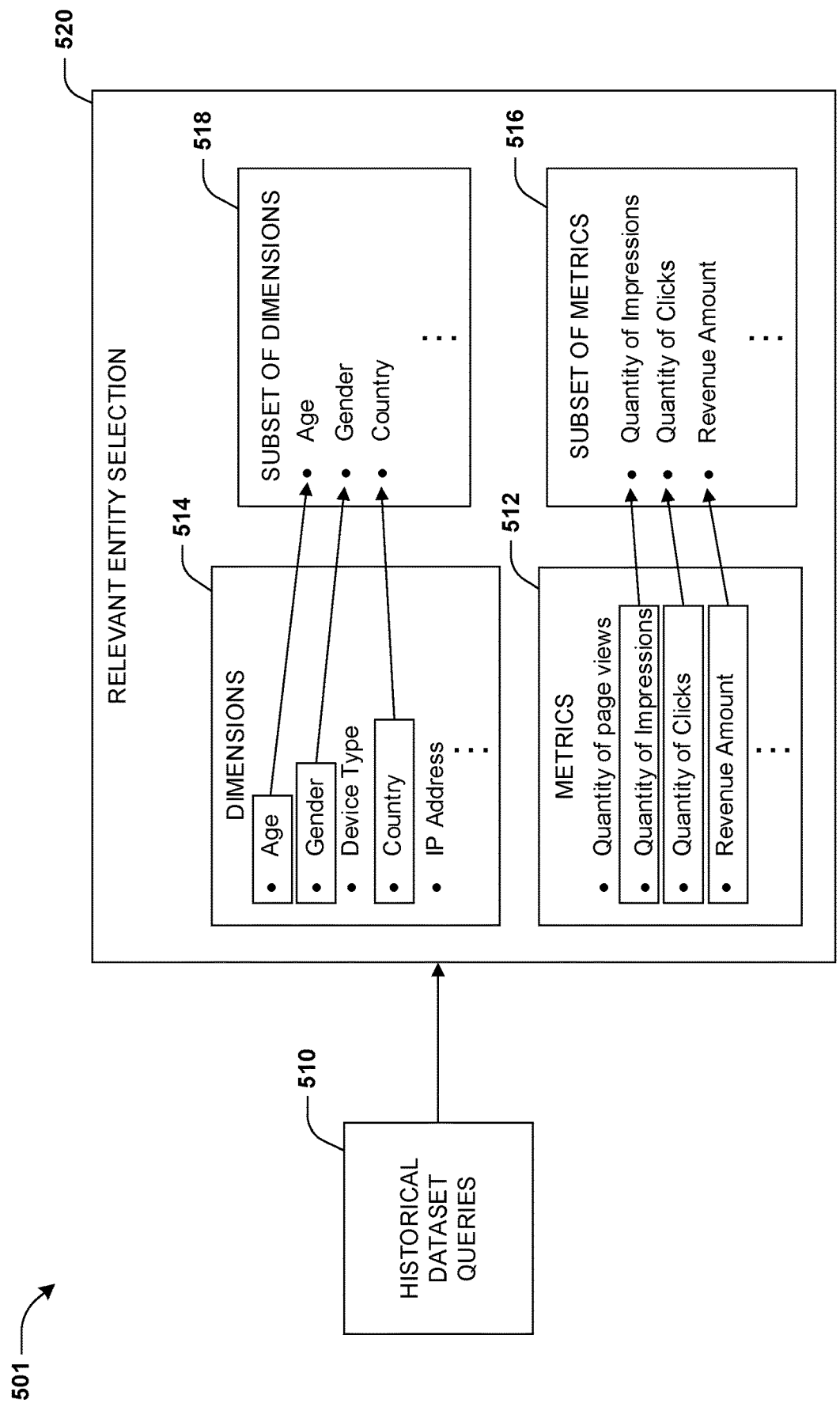
FIG. 5B is a component block diagram illustrating an example system for generating relevant sets of results using datasets, where a subset of dimensions and/or a subset of metrics are selected.

At 404, a subset of dimensions of the plurality of dimensions and/or a subset of metrics of the plurality of metrics may be selected based upon historical dataset queries. In some examples, a subset of dimension elements of the plurality of sets of dimension elements may be selected based upon the historical dataset queries. FIG. 5B illustrates selection of the subset of dimensions (shown with reference number 518) and the subset of metrics (shown with reference number 516) from the plurality of dimensions (shown with reference number 514) and the plurality of metrics (shown with reference number 512), respectively. For example, the selection may be performed by a relevant entity selection module 520 configured to select a subset of relevant entities (e.g., relevant dimensions, metrics and/or dimension elements) from entities (e.g., dimensions, metrics and/or dimension elements) associated with the first dataset. The historical dataset queries (shown with reference 510) may be input to the relevant entity selection module 520 and the relevant entity selection module 520 may select the relevant entities based upon the historical dataset queries 510.

In some examples, a query of the historical dataset queries 510 (and/or each query of the historical dataset queries 510) may define a set of one or more criteria for use in generating a set of results based upon a dataset (e.g., a dataset with structured data). For example, a query of the historical dataset queries 510 may comprise one or more terms indicative of one or more dimensions, one or more terms indicative of one or more metrics and/or one or more terms indicative of one or more dimension elements. The query may have been used by the first user and/or the data management system 504 to generate a set of results (e.g., a report), based upon a dataset (e.g., the first dataset), according to the one or more dimensions, the one or more metrics and/or the one or more dimension elements.

In some examples, the historical dataset queries 510 (based upon which the subset of dimensions, the subset of metrics and/or the subset of dimension elements are selected) are selected from historical dataset query information indicative of a plurality of historical dataset queries (e.g., dataset queries previously utilized for generation of sets of results). The historical dataset queries 510 may comprise one or more queries associated with the first client device 500, the first user and/or a first user account of the first user. For example, the one or more queries are received (e.g., previously received) by the first client device 500, the first user and/or the first user account. For example, the one or more queries may have been input to the data management system 504 for use in generating one or more sets of results (e.g., one or more reports) based upon one or more datasets (e.g., the first dataset). The one or more queries may be selected for inclusion in the historical dataset queries 510 based upon a determination that the one or more queries are associated with (e.g., were input by) the first client device 500, the first user and/or the first user account.

Alternatively and/or additionally, the historical dataset queries 510 may comprise one or more queries used in association with the first dataset and/or in association with a dataset of the same type as the first dataset. For example, the one or more queries may have been input to the data management system 504 for use in generating one or more sets of results (e.g., one or more reports) based upon the first dataset and/or one or more datasets of the same type as the first dataset. In an example in which the first dataset is a content item event dataset, the one or more datasets may be one or more content item event datasets. The one or more queries may be selected for inclusion in the historical dataset queries 510 based upon a determination that the one or more queries were used in association with the first dataset and/or in association with a dataset of the same type as the first dataset.

The historical dataset queries 510 may comprise one or more queries associated with a group of users of which the first user is a part. For example, each query of the one or more queries is input (e.g., previously input) by a user of the group of users, for use in generating one or more sets of results (e.g., one or more reports) based upon one or more datasets. In some examples, the group of users may be determined based upon a user category associated with the first user, wherein each user of the group of users may be associated with the user category. The user category may be based upon one or more types of datasets that the first user has access to and/or one or more types of datasets that the first user uses for generation of data reports. The one or more queries may be selected for inclusion in the historical dataset queries 510 based upon a determination that the one or more queries were input by users of the group of users.

In some examples, the historical dataset queries 510 may comprise one or more first queries indicative of first dimensions, one or more second queries indicative of first metrics and/or one or more third queries indicative of first dimension elements (e.g., the one or more first queries, the one or more second queries and/or the one or more third queries may overlap with each other). The subset of dimensions 518, the subset of metrics 516 and/or the subset of dimension elements may be selected based upon the first dimensions, the first metrics and/or the first dimension elements. In an example, a dimension of the plurality of dimensions 514 may be selected for inclusion in the subset of dimensions 518 based upon a determination that the dimension matches a dimension of the first dimensions. Alternatively and/or additionally, a metric of the plurality of metrics 512 may be selected for inclusion in the subset of metrics 516 based upon a determination that the metric matches a metric of the first metrics. Alternatively and/or additionally, a dimension element of the plurality of sets of dimension elements may be selected for inclusion in the subset of dimension elements based upon a determination that the dimension element matches a dimension element of the first dimension elements.

In some examples, relevance scores associated with dimensions, metrics and/or dimension elements may be determined, where the subset of dimensions 518, the subset of metrics 516 and/or the subset of dimension elements are selected based upon the relevance scores. For example, a first plurality of relevance scores associated with the plurality of dimensions 514 may be determined, wherein a relevance score of the first plurality of relevance scores (and/or each relevance score of the first plurality of relevance scores) may be associated with a dimension of the plurality of dimensions 514. A second plurality of relevance scores associated with the plurality of metrics 512 may be determined, wherein a relevance score of the second plurality of relevance scores (and/or each relevance score of the second plurality of relevance scores) may be associated with a metric of the plurality of metrics 512. A third plurality of relevance scores associated with dimension elements of the plurality of sets of dimension elements may be determined, wherein a relevance score of the third plurality of relevance scores (and/or each relevance score of the third plurality of relevance scores) may be associated with a dimension element of the plurality of sets of dimension elements.

In an example, a first relevance score of the first plurality of relevance scores may be associated with a first dimension of the plurality of dimensions 514. The first relevance score may be determined based upon a quantity of queries, of the historical dataset queries 510, associated with the first dimension (e.g., a quantity of queries, of the historical dataset queries 510, that comprise an indication of the first dimension). In an example, the quantity of queries may correspond to a quantity of times that, among the historical dataset queries 510, the first dimension is used (by the data management system 504, for example) for generation of a set of results. For example, a higher value of the quantity of queries may correspond to (e.g., result in) a higher value of the first relevance score. Alternatively and/or additionally, the first relevance score may be determined based upon a recency of one or more queries, of the historical dataset queries 510, associated with the first dimension. For example, the recency may be based upon a duration of time since a query, comprising an indication of the first dimension, was used for generation of a set of results (e.g., a report). In some examples, a higher value of the recency may correspond to (e.g., result in) a higher value of the first relevance score. In some examples, the quantity of queries and/or the recency may be combined (e.g., at least one of multiplied, added, etc.) to determine the first relevance score. For example, one or more operations (e.g., mathematical operations) may be performed using the quantity of queries and/or the recency to determine the first relevance score. Other relevance scores (other than the first relevance score) of the first plurality of relevance scores may be determined using one or more of the techniques provided herein with respect to determining the first relevance score associated with the first dimension.

In some examples, the subset of dimensions 518 may be selected from among the plurality of dimensions 514 based upon a determination that the subset of dimensions 518 are associated with highest relevance scores of the first plurality of relevance scores. Alternatively and/or additionally, the subset of dimensions 518 may be selected from among the plurality of dimensions 514 based upon a determination that the subset of dimensions 518 are associated with k highest relevance scores of the first plurality of relevance scores (e.g., dimensions associated with the k highest relevance scores of the first plurality of relevance scores may be included in the subset of dimensions 518). In an example where k is 10, 10 dimensions associated with the 10 highest relevance scores of the first plurality of relevance scores may be selected and/or included in the subset of dimensions 518. Alternatively and/or additionally, the plurality of dimensions 514 may be ranked based upon the first plurality of relevance scores (e.g., a dimension having a higher relevance score of the first plurality of relevance scores is ranked higher than a dimension having a lower relevance score of the first plurality of relevance scores), and/or the top k ranked dimensions may be selected from among the plurality of dimensions 514 (e.g., the top k ranked dimensions may be included in the subset of dimensions 518). Alternatively and/or additionally, the subset of dimensions 518 may be selected from among the plurality of dimensions 514 based upon a determination that the subset of dimensions 518 are associated with relevance scores (of the first plurality of relevance scores) that meet (e.g., exceed) a first threshold relevance score (e.g., dimensions that are associated with relevance scores, of the first plurality of relevance scores, that do not meet the first threshold relevance score may not be included in the subset of dimensions 518).

In an example, a second relevance score of the second plurality of relevance scores may be associated with a first metric of the plurality of metrics 512. The second relevance score may be determined based upon a quantity of queries, of the historical dataset queries 510, associated with the first metric (e.g., a quantity of queries, of the historical dataset queries 510, that comprise an indication of the first metric). In an example, the quantity of queries may correspond to a quantity of times that, among the historical dataset queries 510, the first metric is used (by the data management system 504, for example) for generation of a set of results. For example, a higher value of the quantity of queries may correspond to (e.g., result in) a higher value of the second relevance score. Alternatively and/or additionally, the second relevance score may be determined based upon a recency of one or more queries, of the historical dataset queries 510, associated with the first metric. For example, the recency may be based upon a duration of time since a query, comprising an indication of the first metric, was used for generation of a set of results (e.g., a report). In some examples, a higher value of the recency may correspond to (e.g., result in) a higher value of the second relevance score. In some examples, the quantity of queries and/or the recency may be combined (e.g., at least one of multiplied, added, etc.) to determine the second relevance score. For example, one or more operations (e.g., mathematical operations) may be performed using the quantity of queries and/or the recency to determine the second relevance score. Other relevance scores (other than the second relevance score) of the second plurality of relevance scores may be determined using one or more of the techniques provided herein with respect to determining the second relevance score associated with the first metric.

In some examples, the subset of metrics 516 may be selected from among the plurality of metrics 512 based upon a determination that the subset of metrics 516 are associated with highest relevance scores of the second plurality of relevance scores. Alternatively and/or additionally, the subset of metrics 516 may be selected from among the plurality of metrics 512 based upon a determination that the subset of metrics 516 are associated with n highest relevance scores of the second plurality of relevance scores (e.g., metrics associated with the n highest relevance scores of the second plurality of relevance scores may be included in the subset of metrics 516). Alternatively and/or additionally, the plurality of metrics 512 may be ranked based upon the second plurality of relevance scores (e.g., a metric having a higher relevance score of the second plurality of relevance scores is ranked higher than a metric having a lower relevance score of the second plurality of relevance scores), and/or the top n ranked metrics may be selected from among the plurality of metrics 512 (e.g., the top n ranked metrics may be included in the subset of metrics 516). Alternatively and/or additionally, the subset of metrics 516 may be selected from among the plurality of metrics 512 based upon a determination that the subset of metrics 516 are associated with relevance scores (of the second plurality of relevance scores) that meet (e.g., exceed) a second threshold relevance score (e.g., metrics that are associated with relevance scores, of the second plurality of relevance scores, that do not meet the second threshold relevance score may not be included in the subset of metrics 516).

In an example, a third relevance score of the third plurality of relevance scores may be associated with a first dimension element of the plurality of dimension elements. The third relevance score may be determined based upon a quantity of queries, of the one or more third queries, associated with the first dimension element (e.g., a quantity of queries, of the one or more third queries, that comprise an indication of the first dimension element). In an example, the quantity of queries may correspond to a quantity of times that, among the historical dataset queries 510, the first dimension element is used (by the data management system 504, for example) for generation of a set of results. For example, a higher value of the quantity of queries may correspond to (e.g., result in) a higher value of the third relevance score. Alternatively and/or additionally, the third relevance score may be determined based upon a recency of one or more queries, of the one or more third queries, associated with the first dimension element. For example, the recency may be based upon a duration of time since a query, comprising an indication of the first dimension element, was used for generation of a set of results (e.g., a report). In some examples, a higher value of the recency may correspond to (e.g., result in) a higher value of the third relevance score. In some examples, the quantity of queries and/or the recency may be combined (e.g., at least one of multiplied, added, etc.) to determine the third relevance score. For example, one or more operations (e.g., mathematical operations) may be performed using the quantity of queries and/or the recency to determine the third relevance score. Other relevance scores (other than the third relevance score) of the third plurality of relevance scores may be determined using one or more of the techniques provided herein with respect to determining the third relevance score associated with the first dimension element.

In some examples, the subset of dimension elements may be selected from among the plurality of sets of dimension elements based upon a determination that the subset of dimension elements are associated with highest relevance scores of the third plurality of relevance scores. Alternatively and/or additionally, the subset of dimension elements may be selected from among the plurality of sets of dimension elements based upon a determination that the subset of dimension elements are associated with m highest relevance scores of the third plurality of relevance scores (e.g., dimension elements associated with the m highest relevance scores of the third plurality of relevance scores may be included in the subset of dimension elements). Alternatively and/or additionally, the plurality of sets of dimension elements may be ranked based upon the third plurality of relevance scores (e.g., a dimension element having a higher relevance score of the third plurality of relevance scores is ranked higher than a dimension element having a lower relevance score of the third plurality of relevance scores), and/or the top m ranked dimension elements may be selected from among the plurality of sets of dimension elements (e.g., the top m ranked dimension elements may be included in the subset of dimension elements). Alternatively and/or additionally, the subset of dimension elements may be selected from among the plurality of sets of dimension elements based upon a determination that the subset of dimension elements are associated with relevance scores (of the third plurality of relevance scores) that meet (e.g., exceed) a third threshold relevance score (e.g., dimension elements that are associated with relevance scores, of the third plurality of relevance scores, that do not meet the third threshold relevance score may not be included in the subset of dimension elements).

At 406, a plurality of sets of results is generated, using the first dataset, based upon the subset of dimensions 518, the subset of metrics 516 and/or the subset of dimension elements. In some examples, a set of results of the plurality of sets of results (and/or each set of results of the plurality of sets of results) may correspond to a report, such as a data analytics report. In some examples, a set of results of the plurality of sets of results may be used to generate a representation, such as at least one of data, a graph, an image, a chart, a table, etc. In some examples, a set of results of the plurality of sets of results (and/or each set of results of the plurality of sets of results) may be generated based upon one or more dimensions of the subset of dimensions 518, one or more metrics of the subset of metrics 516 and/or one or more dimension elements of the subset of dimension elements.

In some examples, the plurality of sets of results may be generated by iteratively generating sets of results using different combinations of entities from the subset of dimensions 518, the subset of metrics 516 and/or the subset of dimension elements. In an example, iterations of generating sets of results may be performed on the first dataset to generate a first set of results of the plurality of sets of results using a first combination of entities, a second set of results of the plurality of sets of results using a second combination of entities, etc. In an example, the first combination of entities may comprise one or more first dimensions of the subset of dimensions 518, one or more first metrics of the subset of metrics 516 and/or one or more first dimension elements of the subset of dimension elements. The second combination of entities may comprise one or more second dimensions of the subset of dimensions 518, one or more second metrics of the subset of metrics 516 and/or one or more second dimension elements of the subset of dimension elements.

Combinations of entities used to generate sets of results of the plurality of sets of results may be different from each other. For example, the one or more first dimensions of the first combination of entities may be different than the one or more second dimensions of the second combination of entities, the one or more first metrics of the first combination of entities may be different than the one or more second metrics of the second combination of entities, and/or the one or more first dimension elements of the first combination of entities may be different than the one or more second dimension elements of the second combination of entities. For example, there may be at least one entity (e.g., dimension, metric and/or dimension element) that is included in the first combination of entities that is not included in the second combination of entities (and/or there may be at least one entity that is included in the second combination of entities that is not included in the first combination of entities).

Alternatively and/or additionally, the same combination of entities may be used to generate multiple sets of results of the plurality of sets of results. For example, the first combination of entities may be the same as the second combination of entities. In an example, a manner in which an entity (e.g., a dimension, a metric and/or a dimension element) is used to generate the first set of results may be different than a manner in which the entity is used to generate the second set of results. For example, the entity may be utilized according to a first function to generate the first set of results and the entity may be utilized according to a second function to generate the second set of results, where the first function is different than the second function.

In some examples, a function of an entity (e.g., a dimension, a metric and/or a dimension element) may correspond to at least one of a filter function, a grouping function, etc.

In an example, the function of the entity is the filter function. For example, the entity is used in accordance with the filter function to generate a set of results of the plurality of sets of results (e.g., the set of results is generated based upon the entity in accordance with the filter function). In the example, data, of the first dataset, that is used to generate the set of results is filtered based upon the entity. For example, data, in the first dataset, that matches (e.g., is related to) the entity may be identified (e.g., the first dataset may be analyzed based upon the entity to identify the data). The set of results may be generated based upon the data. In an example in which the entity is a dimension, the set of results may be generated based upon data, in the first dataset, that matches (e.g., is related to) the dimension and/or one or more dimension elements of the dimension. In an example, the first dataset may be filtered based upon the United States. For example, the first dataset may be filtered based upon the United States based upon the entity may being a dimension element corresponding to the United States. Alternatively and/or additionally, the first dataset may be filtered based upon the United States based upon the entity may being a country dimension, wherein a dimension element of the country dimension is the United States. The set of results may be generated based upon data, in the first dataset, related to the United States. In an example in which the set of results provides results comprising measures of content item events, the data used to generate the set of results may not include content item event data associated with locations outside of the United States and/or may be limited to content item event data associated with locations within the United States.

In an example, the function of the entity is the grouping function (e.g., "group by" function). For example, the entity is used in accordance with the grouping function to generate a set of results of the plurality of sets of results (e.g., the set of results is generated based upon the entity in accordance with the grouping function). In the example, the set of results is grouped based upon the entity (e.g., measures indicated by the set of results are determined and/or grouped based upon the entity). In an example in which the entity is a dimension, the set of results may be grouped based upon dimension elements of the dimension (e.g., measures indicated by the set of results are determined and/or grouped based upon the dimension elements). For example, each result of the set of results may be determined based upon a dimension element of a plurality of dimension elements associated with the dimension. For example, each result of the set of results may be determined based upon data, of the first dataset, that matches (e.g., is related to) a dimension element of the plurality of dimension elements. In an example in which the entity is a dimension corresponding to "states", the set of results may be determined and/or grouped based upon states of the United States. For example, the set of results may comprise a result determined based upon Ohio (e.g., the result may comprise a measure determined based upon data associated with Ohio), a result determined based upon California (e.g., the result may comprise a measure determined based upon data associated with California), etc.

In some examples, a model (e.g., a machine learning model and/or a statistical model) and/or an algorithm (e.g., a machine learning algorithm and/or a statistical algorithm) may be employed to generate the plurality of sets of results. For example, different combinations of entities may be determined using the model and/or the algorithm based upon the subset of dimensions 518, the subset of metrics 516 and/or the subset of dimension elements. Alternatively and/or additionally, functions by which entities of a combination of entities are utilized for generation of a set of results of the plurality of sets of results may be determined using the model and/or the algorithm. Alternatively and/or additionally, the functions associated with the entities of the combination of entities may be determined based upon the historical dataset queries 510 and/or other historical activity information associated with the data management system 504. For example, the functions associated with the entities of the combination of entities may be determined based upon functions of entities used (e.g., previously used by the data management system 504) for generation of sets of results (as indicated by the historical dataset queries 510 and/or the other historical activity information, for example). Alternatively and/or additionally, the model and/or the algorithm may be used to generate a set of results based upon a combination of entities and/or based upon determined functions associated with the combination of entities.

In some examples, a set of results of the plurality of sets of results (and/or each set of results of the plurality of sets of results) may be associated with a first time window (e.g., a day, a week, etc.). For example, the set of results may be generated based upon data, in the first dataset, related to the first time window. In an example in which the set of results provides results comprising measures of content item events, the data, of the first dataset, used to generate the set of results may not include content item event data associated with times outside the first time window and/or may be limited to content item event data associated with times within the first time window. In an example, the first time window may be determined based upon information (e.g., user-input information indicating a preferred time window) received from the first client device 500. Alternatively and/or additionally, the first time window may be determined based upon the historical dataset queries 510 and/or other historical activity information associated with the data management system 504. For example, the first time window associated with the plurality of sets of results may be determined based upon time windows used (e.g., previously used by the data management system 504) for generation of sets of results (as indicated by the historical dataset queries 510 and/or the other historical activity information, for example).

In some examples, generation of a set of results of the plurality of sets of results comprises: (i) generating a query based upon a combination of entities (e.g., one or more dimensions, one or more metrics and/or one or more dimension elements) and/or based upon one or more functions associated with one or more entities of the combination of entities (e.g., the query may be generated in accordance with a data management system language used by the data management system 504, such as Structured Query Language (SQL) and/or a different language), (ii) inputting the query to a results generation module of the data management system 504, and/or (iii) generating, using the results generation module, the set of results based upon the query.

At 408, a plurality of significance scores is determined based upon the plurality of sets of results. A significance score of the plurality of significance scores (and/or each significance score of the plurality of significance scores) is associated with a set of results of the plurality of sets of results. For example, the plurality of significance scores may comprise at least one of a first significance score associated with the first set of results (e.g., the first significance score may be determined based upon the first set of results), a second significance score associated with the second set of results (e.g., the second significance score may be determined based upon the second set of results), etc.

In some examples, the first significance score is reflective of (and/or based upon) a change (e.g., an increase and/or decrease) across measures associated with the first set of results (e.g., the measures may comprise one or more measures indicated by the first set of results and/or one or more measures indicated by one or more comparable set of results).

In some examples, the first significance score is determined based upon a minimum of the first set of results (e.g., the minimum may correspond to a minimum measure indicated by the first set of results). In an example, the first significance score may be equal to the minimum. Alternatively and/or additionally, the first significance score may be determined by combining the minimum with one or more other values. For example, one or more operations (e.g., mathematical operations, such as at least one of an addition operation, a subtraction operation, a multiplication operation, a division operation, etc.) may be performed using the minimum and/or the one or more other values to determine the first significance score.

In some examples, the first significance score is determined based upon a maximum of the first set of results (e.g., the maximum may correspond to a maximum measure indicated by the first set of results). In an example, the first significance score may be equal to the maximum. Alternatively and/or additionally, the first significance score may be determined by combining the maximum with one or more other values. For example, one or more operations (e.g., mathematical operations, such as at least one of an addition operation, a subtraction operation, a multiplication operation, a division operation, etc.) may be performed using the maximum and/or the one or more other values to determine the first significance score.

In some examples, the first significance score is determined based upon a difference between the minimum and the maximum. In an example, the first significance score may be equal to the difference. Alternatively and/or additionally, the first significance score may be determined by combining the difference with one or more other values. For example, one or more operations (e.g., mathematical operations, such as at least one of an addition operation, a subtraction operation, a multiplication operation, a division operation, etc.) may be performed using the difference and/or the one or more other values to determine the first significance score. In some examples, a higher value of the difference may correspond to (e.g., result in) a higher value of the first significance score.

In some examples, the first significance score is determined based upon a standard deviation of results of the first set of results. In an example, the first significance score may be equal to the standard deviation. Alternatively and/or additionally, the first significance score may be determined by combining the standard deviation with one or more other values. For example, one or more operations (e.g., mathematical operations, such as at least one of an addition operation, a subtraction operation, a multiplication operation, a division operation, etc.) may be performed using the standard deviation and/or the one or more other values to determine the first significance score. In some examples, a higher value of the standard deviation may correspond to (e.g., result in) a higher value of the first significance score.

In some examples, the first significance score is determined based upon the first set of results associated with the first time window and a comparable set of results associated with a second time window, such as where the second time window is before the first time window. In some examples, the comparable set of results may be generated for comparison with the first set of results. In an example, a duration of the second time window may be the same as a duration of the first time window (e.g., in an example in which the first time window corresponds to the week of August 8th through August 14th, the second time window may correspond to the week of August 1st through August 7th). In some examples, the comparable set of results may be generated using the same combination of entities (with the same functions, for example) as the first set of results (e.g., the first combination of entities). For example, the comparable set of results and the first set of results may be generated using the same query. Alternatively and/or additionally, the comparable set of results and the first set of results may be generated using different queries, wherein the different queries indicate the same entities (e.g., the same dimensions, the same metrics and/or the same dimension elements), the same functions for the entities, and/or different time windows (e.g., a query for the first set of results may indicate the first time window and/or a query for the comparable set of results may indicate the second time window).

In some examples, the first significance score may be determined based upon a comparison of the first set of results with the comparable set of results. For example, the first significance score may be determined based upon one or more first values, determined based upon the first set of results, and one or more second values determined based upon the comparable set of results. In some examples, the one or more first values may comprise the minimum of the first set of results, the maximum of the first set of results, an average of the first set of results (e.g., the average may correspond to an average of measures indicated by the first set of results), a first measure indicated by the first set of results, and/or one or more other values determined based upon the first set of results. In some examples, the one or more second values may comprise a second minimum of the comparable set of results (e.g., the second minimum may correspond to a minimum measure indicated by the comparable set of results), a second maximum of the comparable set of results (e.g., the second maximum may correspond to a maximum measure indicated by the comparable set of results), a second average of the comparable set of results (e.g., the second average may correspond to an average of measures indicated by the comparable set of results), a second measure indicated by the comparable set of results, and/or one or more other values determined based upon the first set of results. In some examples, the first significance score may be determined based upon a combination of the one or more first values and the one or more second values (e.g., the first significance score may be determined based upon a comparison of the one or more first values with the one or more second values). In some examples, one or more differences between the one or more first values and the one or more second values may be determined. For example, the one or more differences may comprise a difference between the minimum and the second minimum, a difference between the maximum and the second maximum, a difference between the average and the second average, and/or a difference between the first measure and the second measure. In some examples, the first significance score may be determined based upon the one or more differences. For example, one or more operations (e.g., mathematical operations, such as at least one of an addition operation, a subtraction operation, a multiplication operation, a division operation, etc.) may be performed using the one or more differences and/or one or more other values to determine the first significance score. In some examples, a higher value of a difference of the one or more differences may correspond to (e.g., result in) a higher value of the first significance score.

Alternatively and/or additionally, the first significance score may be determined based upon a rate of change (e.g., a slope) across measures associated with the first set of results (e.g., the measures may comprise one or more measures indicated by the first set of results and/or one or more measures indicated by the comparable set of results). In an example, the first significance score may be equal to the rate of change. Alternatively and/or additionally, the first significance score may be determined by combining the rate of change with one or more other values. For example, one or more operations (e.g., mathematical operations, such as at least one of an addition operation, a subtraction operation, a multiplication operation, a division operation, etc.) may be performed using the rate of change and/or the one or more other values to determine the first significance score. In some examples, a higher value of the rate of change may correspond to (e.g., result in) a higher value of the first significance score.

Other significance scores (other than the first significance score) of the plurality of significance scores may be determined using one or more of the techniques provided herein with respect to determining the first significance score associated with the first set of results.

Figure 5C:
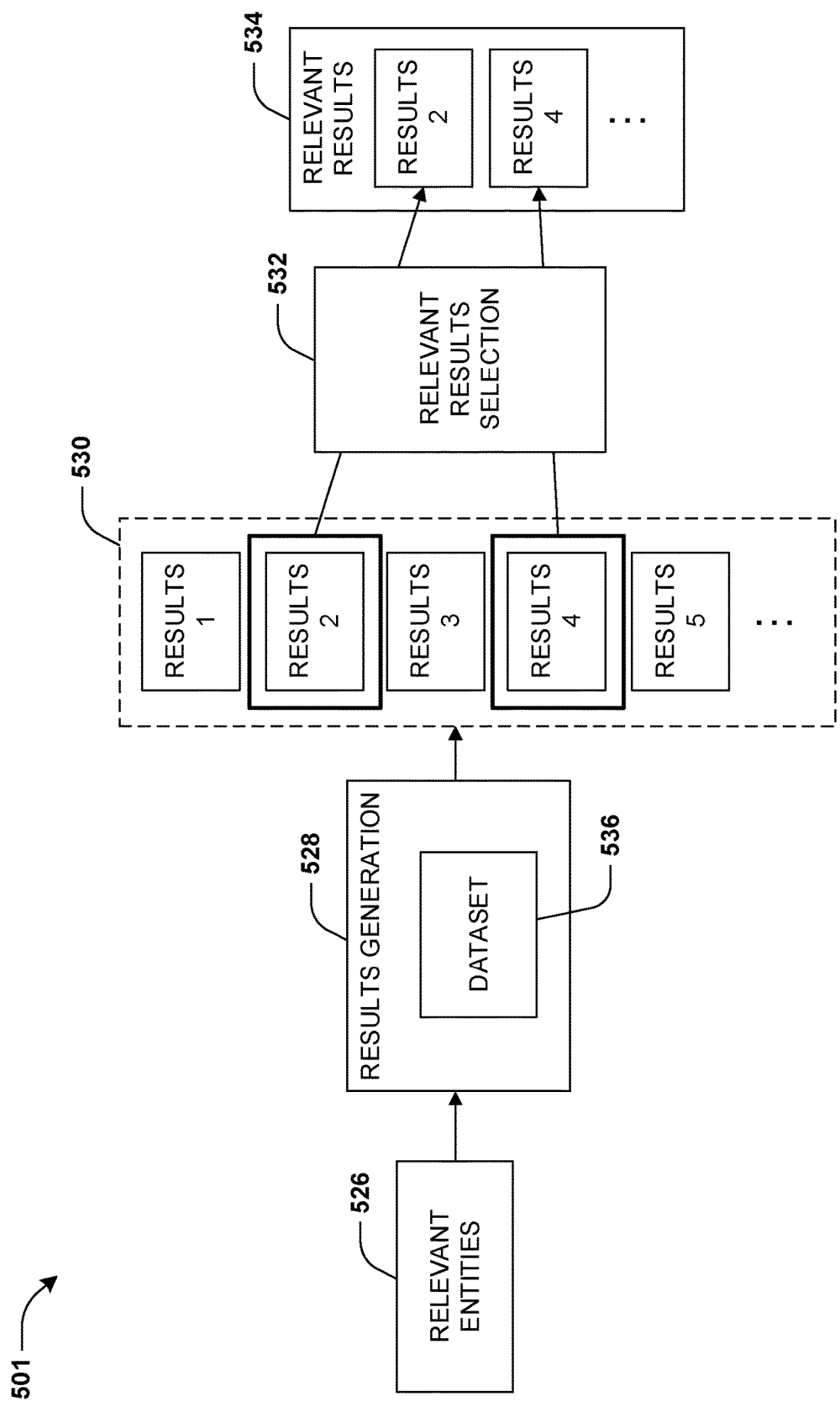
FIG. 5C is a component block diagram illustrating an example system for generating relevant sets of results using datasets, where a plurality of sets of results are generated and one or more relevant sets of results are selected from the plurality of sets of results.

At 410, one or more relevant sets of results, of the plurality of sets of results, are selected based upon the plurality of significance scores. FIG. 5C illustrates selection of the one or more relevant sets of results (shown with reference number 534). In some examples, a plurality of relevant entities 526 may be input to a results generation module 528. The plurality of relevant entities 526 may comprise the subset of dimensions 518, the subset of metrics 516 and/or the subset of dimension elements. The results generation module 528 generates the plurality of sets of results (shown with reference number 530) using the first dataset (shown with reference number 536). A relevant results selection module 532 selects the one or more relevant sets of results 534 from the plurality of sets of results 530. For example, the relevant results selection module 532 determines the plurality of significance scores associated with the plurality of sets of results 530, and selects the one or more relevant sets of results 534 based upon the plurality of significance scores. In the example shown in FIG. 5C, a set of results "RESULTS 2" and a set of results "RESULTS 4" are selected from the plurality of sets of results 530 for inclusion in the one or more relevant sets of results 534.

In some examples, the one or more relevant sets of results 534 may be selected from among the plurality of sets of results 530 based upon a determination that the one or more relevant sets of results 534 are associated with highest significance scores of the plurality of significance scores. Alternatively and/or additionally, the one or more relevant sets of results 534 may be selected from among the plurality of sets of results 530 based upon a determination that the one or more relevant sets of results 534 are associated with p highest significance scores of the plurality of significance scores (e.g., sets of results associated with the p highest significance scores of the plurality of significance scores may be included in the one or more relevant sets of results 534). In an example where p is 10, 10 sets of results associated with the 10 highest significance scores of the plurality of significance scores may be selected and/or included in the one or more relevant sets of results 534. Alternatively and/or additionally, the plurality of sets of results 530 may be ranked based upon the plurality of significance scores (e.g., a set of results having a higher significance score of the plurality of significance scores is ranked higher than a set of results having a lower significance score of the plurality of significance scores), and/or the top p ranked sets of results may be selected from among the plurality of sets of results 530 (e.g., the top p ranked sets of results may be included in the one or more relevant sets of results 534). Alternatively and/or additionally, the one or more relevant sets of results 534 may be selected from among the plurality of sets of results 530 based upon a determination that the one or more relevant sets of results 534 are associated with significance scores (of the plurality of significance scores) that meet (e.g., exceed) a first threshold significance score (e.g., sets of results that are associated with significance scores, of the plurality of significance scores, that do not meet the first threshold significance score may not be included in the one or more relevant sets of results 534).

In an example, the first set of results associated with the first combination of entities is selected for inclusion in the one or more relevant sets of results 534. For example, the first set of results may be included in the one or more relevant sets of results 534 based upon a determination that the first significance score associated with the first set of results is higher than other significance scores of the plurality of significance scores. Alternatively and/or additionally, the first set of results may be included in the one or more relevant sets of results 534 based upon a determination that the first significance score is one of the p highest significance scores of the plurality of significance scores. Alternatively and/or additionally, the first set of results may be included in the one or more relevant sets of results 534 based upon a determination that the first significance score meets (e.g., exceeds) the first threshold significance score.

In some examples, one or more representations of the one or more relevant sets of results 534 may be generated. In some examples, a representation of the one or more representations (and/or each representation of the one or more representations) is representative of a set of results of the one or more relevant sets of results 534. For example, the one or more representations comprise a first representation of the first set of results in the one or more relevant sets of results 534. In an example, the first representation of the first set of results may comprise at least one of text, a graphical representation, a table, a graph, a chart, an image, etc. representative of information of the first set of results.

One, some and/or all of the one or more representations may be transmitted to a device and/or presented via the device, such as the first client device 500. For example, one, some and/or all of the one or more representations (and/or a link to access one, some and/or all of the one or more representations) may be sent to at least one of an email account of the first user, a messaging account of the first user, etc. Alternatively and/or additionally, one, some and/or all of the one or more representations may be automatically displayed via the first client device 500.

Figure 5D:
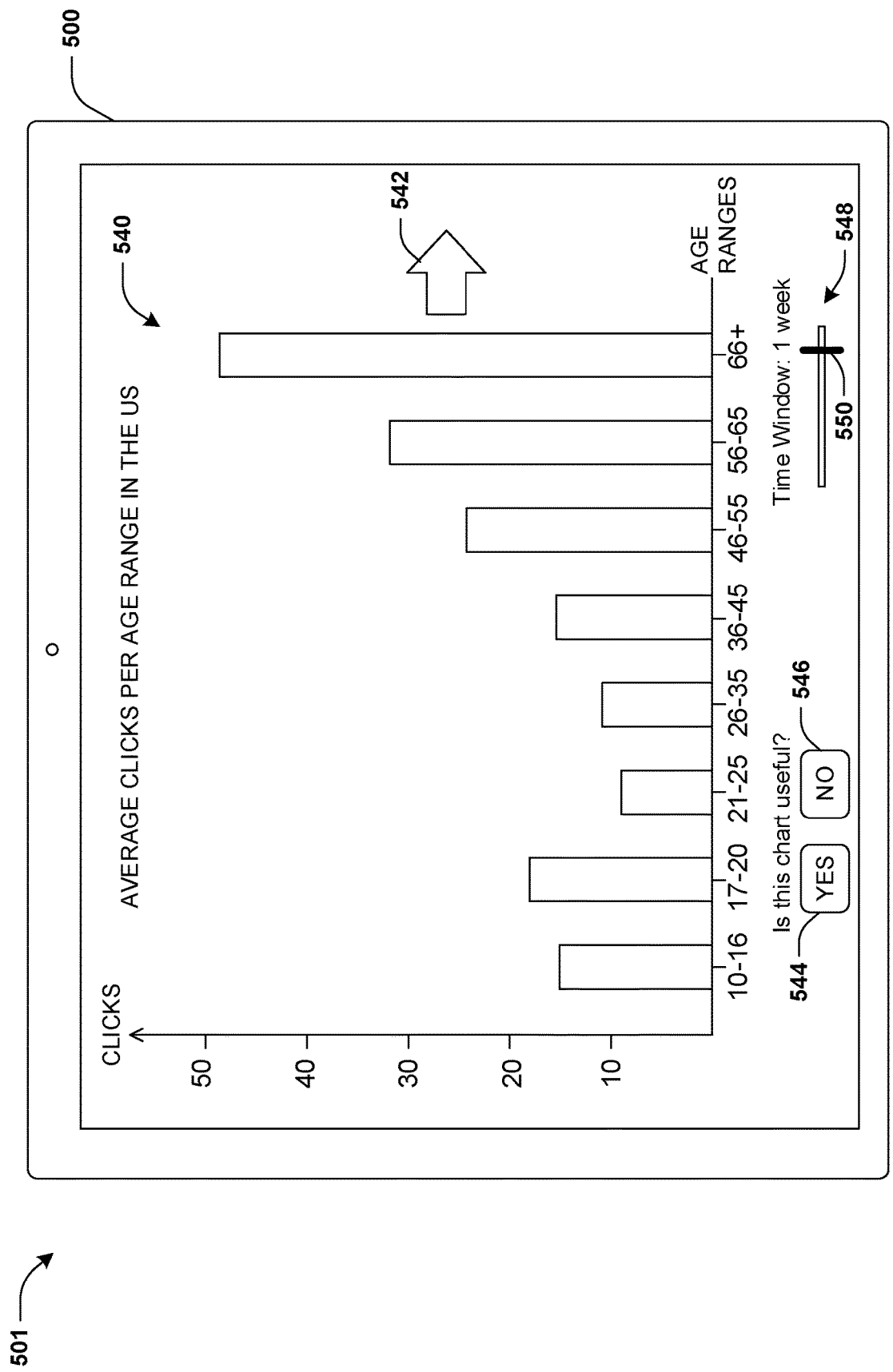
FIG. 5D is a component block diagram illustrating an example system for generating relevant sets of results using datasets, where a representation of a relevant set of results is presented via a first client device.

FIG. 5D illustrates presentation of the first representation (shown with reference number 540) of the first set of results. In some examples, the first representation 540 is presented via a data analytics interface displayed by the first client device 500. In the example shown in FIG. 5D, the first set of results comprises measures of content item selections (e.g., clicks) per age range in the United States, and the first representation 540 is a chart representative of the first set of results. In an example, the first combination of entities based upon which the first set of results is generated may comprise an age dimension (e.g., a dimension corresponding to ages of users), a dimension or dimension element corresponding to the United States and/or a content item selection metric (e.g., a metric corresponding to a measure of content item selections, such as an average quantity of content item selections).

In some examples, a function, of the dimension or the dimension element corresponding to the United States, for use in generating the first set of results is a filter function. For example, the dimension or the dimension element corresponding to the United States may be utilized according to the filter function to generate the first set of results. For example, data, of the first dataset 536, that is used to generate the first set of results is based upon the United States. For example, the data used to generate the first set of results includes content item event data associated with locations within the United States and/or may not include content item event data associated with locations outside of the United States. For example, content item selections that occur within the United States (as indicated by the first dataset 536) may be counted towards measures of content item selections indicated by the first set of results, and/or content item selections that occur outside the United States may not be counted towards measures of content item selections indicated by the first set of results.

In some examples, a function, of the age dimension, for use in generating the first set of results is a grouping function. For example, the age dimension may be utilized according to the grouping function to generate the first set of results. For example, measures of content item selections indicated by the first set of results may be determined based upon (and/or grouped based upon) dimension elements of the age dimension (e.g., the dimension elements of the age dimension may comprise age ranges, such as at least one of 10-16, 17-20, etc.). For example, a first measure of content item selections indicated by the first set of results may correspond to an average quantity of clicks per user in the United States that belongs to a first age range 10-16, a second measure of content item selections indicated by the first set of results may correspond to an average quantity of clicks per user in the United States that belongs to a second age range 17-20, etc.

In some examples, the data analytics interface may display a time window control interface 548 associated with adjusting a time window (e.g., the first time window) of the first set of results. For example, a duration of the time window may be adjusted (e.g., increased and/or decreased) using the time window control interface 548. In an example, the time window control interface 548 may comprise a slider control element, wherein the time window may be based upon a horizontal position of a knob 550 along the slider control element. For example, moving the knob 550 further left along the slider control element may increase the duration of the time window and/or moving the knob 550 further right along the slider control element may decrease the duration of the time window. In response to a change to the time window, the first set of results may be updated (e.g., recalculated) based upon the changed time window. For example, in response to the duration of the time window being changed (e.g., from 1 week to 1 year), an updated set of results may be generated, based upon the first combination of entities, using data (of the first dataset 536) associated with the changed time window (e.g., the past year). An updated representation may be generated based upon the updated set of results, and the updated representation may be displayed via the first client device 500.

In some examples, in addition to presenting the first representation 540, the data analytics interface may display one or more other representations (other than the first representation 540) of the one or more representations of the one or more relevant sets of results 534. The data analytics interface may provide one or more functionalities for navigating throughout the one or more representations (e.g., navigating from displaying one representation to displaying another representation). Alternatively and/or additionally, more than one representation may be displayed via the data analytics interface at a time. In an example, the data analytics interface may display a selectable input 542 corresponding to displaying a different (e.g., next) representation of the one or more representations. For example, in response to a selection of the selectable input 542, a second representation of the one or more representations may be displayed.

In some examples, an order (e.g., arrangement and/or succession) with which the one or more representations are displayed via the first client device 500 and/or the data analytics interface may be based upon one or more rankings associated with the one or more relevant sets of results 534. For example, the one or more rankings may be determined based upon one or more significance scores (of the plurality of significance scores) associated with the one or more relevant sets of results 534 (e.g., a set of results having a higher significance score is ranked higher than a set of results having a lower significance score). Alternatively and/or additionally, the one or more rankings may be determined based upon the historical dataset queries 510 and/or other historical activity information associated with the data management system 504. In an example, a representation with a higher ranking may be displayed at least one of above, before, more prominently, etc. than a representation with a lower ranking. Alternatively and/or additionally the one or more rankings and/or the order with which the one or more representations are displayed may be determined using a heuristic function.

In some examples, a notification of the one or more representations is transmitted to the first client device 500. For example, the notification may be sent to at least one of the email account of the first user, the messaging account of the first user, etc. The notification may comprise one or more indications of the one or more representations. In an example, an indication of the one or more indications (and/or each indication of the one or more indications) comprises a link to a representation of the one or more representations. In some examples, a formatting and/or arrangement of the one or more indications is based upon the one or more rankings. For example, in the notification, an indication of a representation with a higher ranking may be displayed at least one of above, before, more prominently, etc. than an indication of a representation with a lower ranking. Alternatively and/or additionally, indications of the top z ranked representations of the one or more representations may be distinguished from indications of one or more other representations of the one or more representations (such as by way of at least one of bolding, highlighting, increasing a size of, etc. the indications of the top z ranked representations).

In some examples, feedback associated with the one or more representations and/or the one or more relevant sets of results 534 may be determined. For example, the feedback may comprise negative feedback (associated with a representation and/or a set of results) and/or positive feedback (associated with a representation and/or a set of results). In an example, the data analytics interface may display one or more feedback selectable inputs. The one or more feedback selectable inputs may comprise a positive feedback selectable input 544 associated with indicating positive feedback of the first representation 540 and/or a negative feedback selectable input 546 associated with indicating negative feedback of the first representation 540. In an example, in response to receiving a selection of the positive feedback selectable input 544, positive feedback associated with at least one of the first representation 540, the first set of results, the first combination of entities used to generate the first set of results, a query used to generate the first set of results, etc. may be recorded. Alternatively and/or additionally, in response to receiving a selection of the negative feedback selectable input 546, negative feedback associated with at least one of the first representation 540, the first set of results, the first combination of entities used to generate the first set of results, the query used to generate the first set of results, etc. may be recorded. Alternatively and/or additionally, positive feedback and/or negative feedback associated with the first representation 540 and/or the first set of results may be determined based upon information other than a selection of a feedback selectable input, such as based upon a duration of time that the first representation 540 is displayed. In an example, the duration of time being less than a first threshold duration of time may be an indication that the first user is not interested in the first representation 540. Based upon the duration of time being less than the first threshold duration of time, negative feedback associated with at least one of the first representation 540, the first set of results, the first combination of entities used to generate the first set of results, the query used to generate the first set of results, etc. may be recorded. Alternatively and/or additionally, the duration of time exceeding a second threshold duration of time may be an indication that the first user is interested in the first representation 540. Based upon the duration of time exceeding the second threshold duration of time, positive feedback associated with at least one of the first representation 540, the first set of results, the first combination of entities, the query used to generate the first set of results, etc. may be recorded.

In some examples, after determining the feedback (e.g., positive or negative feedback) associated with the first representation 540, the first set of results, the first combination of entities and/or the query used to generate the first set of results, etc. the feedback may be used for at least one of determining relevance scores associated with entities (e.g., dimensions, metrics and/or dimension elements) for use in selecting subsets of relevant entities, determining significance scores associated with sets of results generated based upon relevant entities, etc.

For example, a relevance score associated with an entity of the first combination of entities may be determined based upon the feedback. The relevance score may be determined for use in selecting relevant entities, such as using one or more of the techniques provided herein with respect to act 404 of FIG. 4. In an example, the relevance score associated with the entity may be decreased based upon the feedback if the feedback is negative feedback. Alternatively and/or additionally, the relevance score associated with the entity may be increased based upon the feedback if the feedback is positive feedback.

Alternatively and/or additionally, a significance score, associated with a set of results determined based upon a combination of entities similar to the first combination of entities, may be determined based upon the feedback. The significance score may be determined for use in selecting relevant sets of results, such as using one or more of the techniques provided herein with respect to acts 408 and 410 of FIG. 4. In an example, the combination of entities may be similar to the first combination of entities if the combination of entities is the same as the first combination of entities and/or if the combination of entities comprises one or more entities in common with the first combination of entities. In an example, the significance score may be decreased based upon the feedback if the feedback is negative feedback. Alternatively and/or additionally, the significance score may be increased based upon the feedback if the feedback is positive feedback.

It may be appreciated that determining the relevance score, selecting relevant entities, determining the significance score and/or selecting relevant sets of results based upon the feedback may create a closed-loop process allowing usage of feedback to tailor parameters of the data management system 504, thereby improving (e.g., continuously improving over time) a quality and/or accuracy of generation and/or identification of relevant sets of results by the data management system 504. Closed-loop control may reduce errors and produce more efficient operation of a computer system which implements the data management system 504. The reduction of errors and/or the efficient operation of the computer system may improve operational stability and/or predictability of operation. Accordingly, using processing circuitry to implement closed loop control described herein may improve operation of underlying hardware of the computer system.

In some examples, one or more acts discussed with respect to FIG. 4 and/or FIGS. 5A-5D may be performed periodically. For example, using one or more of the techniques herein, relevant sets of results may be determined using the first dataset 536 (e.g., using updated versions of the first dataset 536, such as where the first dataset 536 is updated with sets of current information over time) and/or notifications of the relevant sets of results may be provided to the first user periodically (e.g., daily, weekly, monthly, etc.). In an example, a frequency with which the relevant sets of results are determined and/or the notifications are sent may be based upon information (e.g., user-input information indicating a preferred frequency) received from the first client device 500. In an example in which the frequency is monthly, one or more second relevant sets of results may be determined about a month after the one or more relevant sets of results 534 are determined. For example, the one or more second relevant sets of results may be determined using an updated version of the first dataset 536 including new information added to the first dataset 536 after the one or more relevant sets of results 534 are generated using the first dataset 536. Alternatively and/or additionally, a second notification of the one or more second relevant sets of results may be transmitted about a month after a notification of the one or more relevant sets of results 534 is transmitted (e.g., the second notification may be transmitted in response to the determining the one or more second relevant sets of results). In an example, the second notification comprises one, some and/or all representations of one or more second representations of the one or more second relevant sets of results. Alternatively and/or additionally, the second notification may comprise a link to access one, some and/or all of the one or more second representations. In some examples, the second notification may be sent to at least one of the email account of the first user, the messaging account of the first user, etc. Alternatively and/or additionally, the second notification may be automatically displayed via the first client device 500.

One or more actions associated with the one or more relevant sets of results may be performed. In an example, the first set of results being selected from the plurality of sets of results 530 for inclusion in the one or more relevant sets of results and/or the first significance score exceeding a second threshold significance score may be an indication that the first set of results is associated with anomalous activity and/or anomalous behavior (e.g., activity and/or behavior that warrants action). In an example, the second threshold significance score may be the same as or different than (e.g., higher than) the first threshold significance score.

In an example, the first dataset 536 comprises a device dataset comprising information associated with operation and/or performance of one or more devices (e.g., one or more computers, one or more machines, etc.). The first set of results being included in the one or more relevant sets of results and/or the first significance score exceeding the second threshold significance score may be an indication that a behavior (e.g., operation and/or performance) of a device of the one or more devices is anomalous. In some examples, one or more settings and/or parameters of the device may be modified (e.g., automatically modified) to correct (and/or mitigate) the anomalous behavior of the device. Alternatively and/or additionally, one or more resources may be allocated to correct (and/or mitigate) the anomalous behavior. In an example, instructions to allocate the one or more resources for correcting and/or mitigating the anomalous behavior may be transmitted to a resource allocation device. For example, the one or more resources may comprise equipment for fixing and/or replacing the device. Alternatively and/or additionally, the one or more resources may comprise at least one of power, network bandwidth, etc. provided to the device to improve performance of the device.

In an example, the first dataset 536 comprises a content item event dataset (e.g., an advertisement event dataset, a marketing event dataset, etc.) comprising information associated with content item events (e.g., advertisement events). The first set of results being included in the one or more relevant sets of results and/or the first significance score exceeding the second threshold significance score may be an indication that content item event traffic associated with one or more content item campaigns is anomalous. For example, the content item event traffic may be affected by fraudulent activity (e.g., advertising fraud), wherein one or more malicious actors (e.g., one or more publishers, one or more client devices, etc. associated with the fraudulent activity) may be identified based upon the first set of results. In some examples, one or more actions may be performed to prevent and/or mitigate the fraudulent activity, such as by way of reducing a quantity of content items provided for the one or more malicious actors, alerting law enforcement of the one or more malicious actors, etc.

In an example, the first set of results being selected from the plurality of sets of results 530 for inclusion in the one or more relevant sets of results and/or the first significance score exceeding the second threshold significance score may be an indication that data of the first dataset 536 (e.g., data of the first dataset 536 that is used to generate the first set of results) is associated with data quality issues. For example, the data associated with data quality issues may be analyzed to identify defective data that is at least one of incorrect, incorrectly structured, corrupted, etc. In some examples, one or more actions may be performed in response to identifying the defective data. For example, the one or more actions may comprise at least one of correcting the defective data, replacing the defective data with corrected data, removing the defective data from the first dataset 536, etc.

It may be appreciated that the disclosed subject matter may assist a user (and/or a device associated with the user) in obtaining one or more relevant sets of results with increased accuracy, increased speed and/or with less (or no) manual effort.

Implementation of at least some of the disclosed subject matter may lead to benefits including, but not limited to, a reduction in screen space and/or an improved usability of a display (e.g., of the device) (e.g., as a result of automatically generating and/or identifying the one or more relevant sets of results, as a result of automatically providing the one or more relevant sets of results to the device, wherein applications and/or windows may not need to be opened and/or used for typing queries and/or selecting parameters to generate sets of results of a dataset, wherein applications and/or windows may not need to be opened and/or used for browsing through generated sets of results to identify relevant sets of results, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
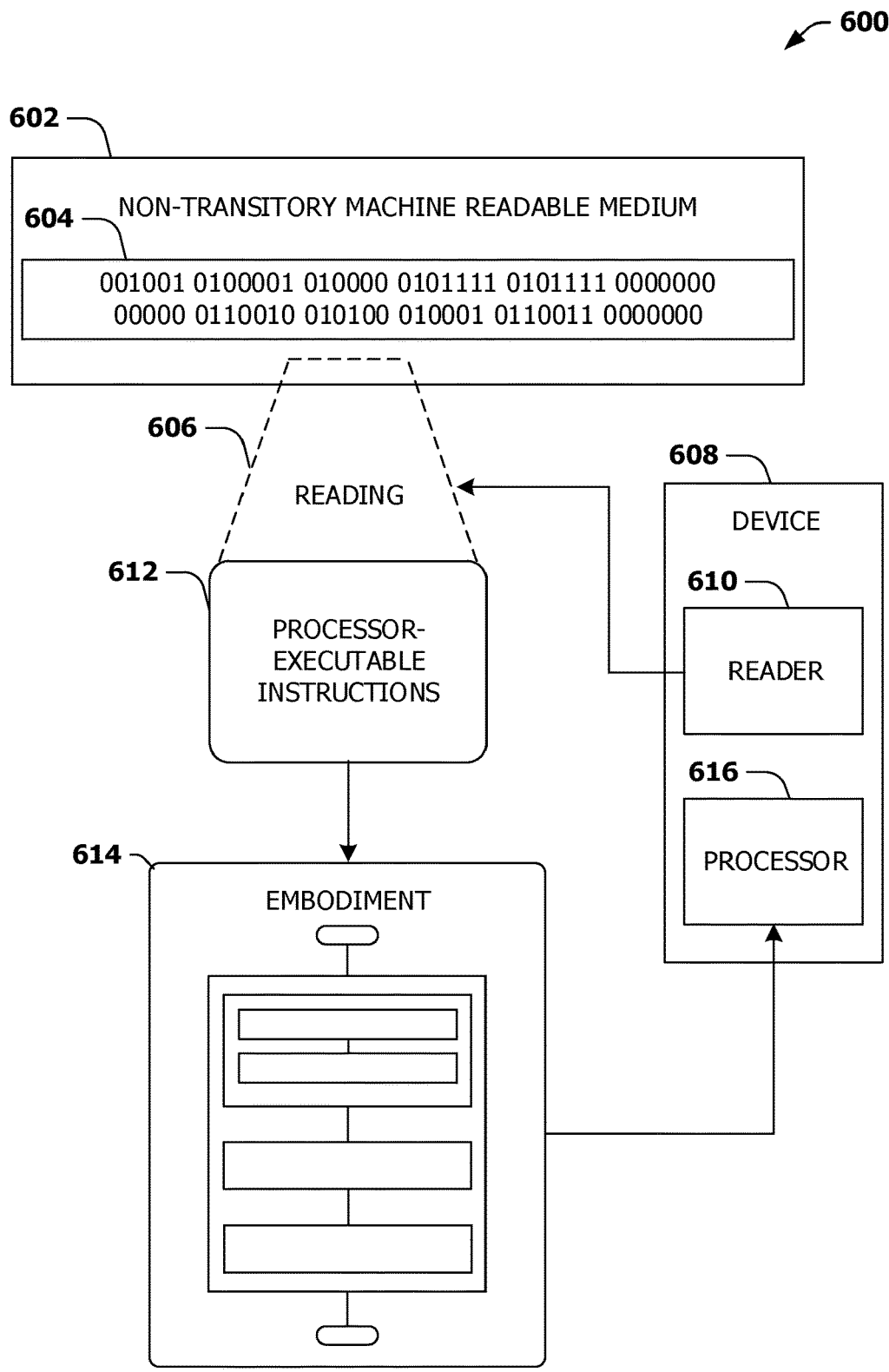
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing a representation of a relevant set of results to a first user, comprising:
   identifying a dataset associated with a plurality of dimensions and a plurality of metrics;
   selecting a plurality of historical dataset queries from historical dataset query information based upon a determination that each query of the plurality of historical dataset queries was previously used by the first user to generate one or more reports;
   selecting, based upon the plurality of historical dataset queries, a subset of dimensions of the plurality of dimensions and a subset of metrics of the plurality of metrics;
   generating, using the dataset, a plurality of sets of results based upon the subset of dimensions and the subset of metrics, wherein generating the plurality of sets of results comprises:
      generating a first set of results based upon a first dimension of the subset of dimensions and a first metric of the subset of metrics; and
      generating a second set of results based upon a second dimension of the subset of dimensions and a second metric of the subset of metrics;
   determining, based upon the plurality of sets of results, a plurality of significance scores, wherein the plurality of significance scores comprises a first significance score associated with the first set of results and a second significance score associated with the second set of results;
   selecting one or more first sets of results, of the plurality of sets of results, based upon the plurality of significance scores;
   determining that the first set of results is associated with at least one of anomalous activity or anomalous behavior based upon the first significance score associated with the first set of results exceeding a threshold significance score;
   in response to determining that the first set of results is associated with the at least one of anomalous activity or anomalous behavior, (i) modifying at least one of one or more settings or one or more parameters of a first device to correct or mitigate the at least one of anomalous activity or anomalous behavior and (ii) allocating one or more resources, comprising equipment for replacing a second device, to correct or mitigate the at least one of anomalous activity or anomalous behavior, wherein the allocating comprises transmitting instructions, to a resource allocation device, to allocate the one or more resources comprising equipment for replacing the second device;
   generating one or more representations of one or more relevant sets of results based upon the one or more first sets of results selected based upon the plurality of significance scores; and
   providing the one or more representations for display via a device of the first user.

2. The method of claim 1, comprising:
   determining one or more rankings of the one or more first sets of results based upon one or more first significance scores, of the plurality of significance scores, associated with the one or more first sets of results, wherein an order in which the one or more representations are displayed via the device is based upon the one or more rankings.

3. The method of claim 2, comprising:
   receiving, from the device, a request for analytical results associated with the dataset, wherein identifying the dataset is based upon the request.

4. The method of claim 1, wherein:
   determining the plurality of significance scores comprises:
      determining the first significance score based upon the first set of results; and
      determining the second significance score based upon the second set of results.

5. The method of claim 4, wherein:
   the first set of results is selected for inclusion in the one or more first sets of results based upon a determination that the first significance score meets a first threshold significance score.

6. The method of claim 1, wherein:
   the historical dataset queries comprise one or more first queries indicative of one or more first dimensions and one or more second queries indicative of one or more first metrics; and
   selecting the subset of dimensions and the subset of metrics is based upon the one or more first dimensions and the one or more first metrics.

7. The method of claim 6, wherein:
   selecting the subset of dimensions and the subset of metrics comprises:
      determining, based upon the one or more first queries, first relevance scores associated with the plurality of dimensions;
      selecting the subset of dimensions based upon the first relevance scores;
      determining, based upon the one or more second queries, second relevance scores associated with the plurality of metrics; and
      selecting the subset of metrics based upon the second relevance scores.

8. The method of claim 1, comprising:
   identifying first data, in the dataset, that matches at least one of the first dimension or a dimension element of the first dimension, wherein generating the first set of results is based upon the first data.

9. The method of claim 1, wherein the allocating comprises transmitting instructions, to the resource allocation device, to allocate one or more second resources, which comprise at least one of power or network bandwidth to one or more devices, to improve performance of the one or more devices.

10. The method of claim 1, wherein the providing the one or more representations for display comprises:
    displaying the one or more representations within a data analytics interface.

11. The method of claim 1, wherein the providing the one or more representations for display comprises:
    displaying the one or more representations within a data analytics interface concurrently with a slider control element within the data analytics interface, wherein adjusting a knob along the slider control element is configured to adjust a time window of the one or more first sets of results between a plurality of durations of time that each correspond to a position of the knob along the slider control element;
in response to the time window being adjusted to an updated time window corresponding to an updated duration of time via an adjustment of the knob along the slider control element to an updated position of the knob, generating an updated set of results using data associated with the updated time window; and
displaying an updated representation within the data analytics interface using the updated set of results.

12. A computing device comprising:
a processor; and
memory comprising processor-executable instructions that when executed by the processor cause performance of operations associated with providing a representation of a relevant set of results to a first user, the operations comprising:
identifying a dataset associated with a plurality of dimensions and a plurality of metrics;
selecting a plurality of historical dataset queries from historical dataset query information based upon a determination that each query of the plurality of historical dataset queries was previously used by the first user to generate one or more reports;
selecting, based upon the plurality of historical dataset queries, a subset of dimensions of the plurality of dimensions and a subset of metrics of the plurality of metrics;
generating, using the dataset, a plurality of sets of results based upon the subset of dimensions and the subset of metrics, wherein generating the plurality of sets of results comprises:
generating a first set of results based upon a first dimension of the subset of dimensions and a first metric of the subset of metrics; and
generating a second set of results based upon a second dimension of the subset of dimensions and a second metric of the subset of metrics;
determining, based upon the plurality of sets of results, a plurality of significance scores, wherein the plurality of significance scores comprises a first significance score associated with the first set of results and a second significance score associated with the second set of results;
selecting one or more first sets of results, of the plurality of sets of results, based upon the plurality of significance scores;
determining that the first set of results is associated with at least one of anomalous activity or anomalous behavior based upon the first significance score associated with the first set of results exceeding a threshold significance score;
in response to determining that the first set of results is associated with the at least one of anomalous activity or anomalous behavior, (i) modifying at least one of one or more settings or one or more parameters of a first device to correct or mitigate the at least one of anomalous activity or anomalous behavior and (ii) allocating one or more resources, comprising equipment for replacing a second device, to correct or mitigate the at least one of anomalous activity or anomalous behavior, wherein the allocating comprises transmitting instructions, to a resource allocation device, to allocate the one or more resources which comprise equipment for replacing the second device;
generating one or more representations of one or more relevant sets of results based upon the one or more first sets of results selected based upon the plurality of significance scores; and
providing the one or more representations for display via a device of the first user.

13. The computing device of claim 12, the operations comprising:
determining one or more rankings of the one or more first sets of results based upon one or more first significance scores, of the plurality of significance scores, associated with the one or more first sets of results, wherein an order in which the one or more representations are displayed via the device is based upon the one or more rankings.

14. The computing device of claim 13, the operations comprising:
receiving, from the device, a request for analytical results associated with the dataset, wherein identifying the dataset is based upon the request.

15. The computing device of claim 12, wherein:
determining the plurality of significance scores comprises:
determining the first significance score based upon the first set of results; and
determining the second significance score based upon the second set of results.

16. The computing device of claim 15, wherein:
the first set of results is selected for inclusion in the one or more first sets of results based upon a determination that the first significance score meets a first threshold significance score.

17. The computing device of claim 12, wherein:
the historical dataset queries comprise one or more first queries indicative of one or more first dimensions and one or more second queries indicative of one or more first metrics; and
selecting the subset of dimensions and the subset of metrics is based upon the one or more first dimensions and the one or more first metrics.

18. The computing device of claim 17, wherein:
selecting the subset of dimensions and the subset of metrics comprises:
determining, based upon the one or more first queries, first relevance scores associated with the plurality of dimensions;
selecting the subset of dimensions based upon the first relevance scores;
determining, based upon the one or more second queries, second relevance scores associated with the plurality of metrics; and
selecting the subset of metrics based upon the second relevance scores.

19. The computing device of claim 12, wherein the allocating comprises transmitting instructions, to the resource allocation device, to allocate one or more second resources, which comprise at least one of power or network bandwidth to one or more devices, to improve performance of the one or more devices.

20. A non-transitory machine readable medium having stored thereon processor-executable instructions that when executed cause performance of operations associated with providing a representation of a relevant set of results to a first user, the operations comprising:
identifying a dataset associated with a plurality of dimensions and a plurality of metrics;

selecting a plurality of historical dataset queries from historical dataset query information based upon a determination that each query of the plurality of historical dataset queries was previously used by the first user to generate one or more reports;

selecting, based upon the plurality of historical dataset queries, a subset of dimensions of the plurality of dimensions and a subset of metrics of the plurality of metrics;

generating, using the dataset, a plurality of sets of results based upon the subset of dimensions and the subset of metrics, wherein generating the plurality of sets of results comprises:
  generating a first set of results based upon a first dimension of the subset of dimensions and a first metric of the subset of metrics; and
  generating a second set of results based upon a second dimension of the subset of dimensions and a second metric of the subset of metrics;

determining, based upon the plurality of sets of results, a plurality of significance scores, wherein the plurality of significance scores comprises a first significance score associated with the first set of results and a second significance score associated with the second set of results;

determining that the first set of results is associated with at least one of anomalous activity or anomalous behavior based upon the first significance score associated with the first set of results exceeding a threshold significance score; and in response to determining that the first set of results is associated with the at least one of anomalous activity or anomalous behavior, (i) modifying at least one of one or more settings or one or more parameters of a first device to correct or mitigate the at least one of anomalous activity or anomalous behavior and (ii) allocating one or more resources, comprising equipment for replacing a second device, to correct or mitigate the at least one of anomalous activity or anomalous behavior, wherein the allocating comprises transmitting instructions, to a resource allocation device, to allocate the one or more resources which comprise equipment for replacing the second device.

* * * * *